United States Patent [19]

Kedar et al.

[11] Patent Number: 5,655,560
[45] Date of Patent: Aug. 12, 1997

[54] CLOG-FREE VALVING SYSTEM

[75] Inventors: Haim Kedar, Palo Alto; Donald T. Roth, Mountain View, both of Calif.

[73] Assignee: Affymax Technologies N.V., Netherlands Antilles

[21] Appl. No.: 357,512

[22] Filed: Dec. 16, 1994

[51] Int. Cl.⁶ .................. B08B 9/00; B08B 9/06; F16K 11/22
[52] U.S. Cl. .............. 137/15; 134/166 C; 137/238; 137/244; 137/597; 222/148; 251/315.16
[58] Field of Search ............ 137/15, 238, 240, 137/242, 244, 597, 883, 884; 251/209, 315.01, 315.16; 15/104.05, 104.16; 134/166 C; 222/148, 149

[56] References Cited

U.S. PATENT DOCUMENTS

| Re. 34,610 | 5/1994 | Miller et al. | 137/597 |
|---|---|---|---|
| 2,510,514 | 6/1950 | Mueller | 251/209 |
| 3,487,853 | 1/1970 | Kern, Jr. | 137/884 |
| 3,557,820 | 1/1971 | Jackson et al. | 137/244 |
| 3,596,680 | 8/1971 | Adams | 137/597 |
| 3,768,511 | 10/1973 | Bias | 137/597 |
| 3,817,283 | 6/1974 | Hewson | 137/884 |
| 4,281,683 | 8/1981 | Hetherington et al. | 137/884 |
| 4,517,338 | 5/1985 | Urdea et al. | 525/54.11 |
| 4,741,354 | 5/1988 | DeMild, Jr. | 137/240 |
| 4,874,014 | 10/1989 | Grant et al. | 137/884 |
| 5,277,224 | 1/1994 | Hutton et al. | 137/597 |

FOREIGN PATENT DOCUMENTS

| 512324 | 6/1976 | U.S.S.R. | 137/242 |
|---|---|---|---|
| WO 91/17823 | 11/1991 | WIPO. | |

*Primary Examiner*—George L. Walton
*Attorney, Agent, or Firm*—Townsend and Townsend and Crew LLP

[57] ABSTRACT

In an exemplary aspect, the invention provides a fluid distribution system including a first fluid path, and a second fluid path that is laterally spaced-apart from the first fluid path. A third fluid path connects the first and the second fluid paths. A valve is provided that is axially translatable through a third fluid path between a first position and a second position. In a first position, the valve is removed from the third fluid path, and in the second position, the valve substantially fills the third fluid path.

31 Claims, 5 Drawing Sheets

CLOG-FREE VALVING SYSTEM

BACKGROUND OF THE INVENTION

1. Field of the Invention

The invention relates to the field of fluid distribution, including both liquids and gasses, and in particular to a multiple input and multiple output valving system employing self-cleaning valves having minimal dead volume.

2. Description of the Background Art

Valving systems for controlling or regulating fluid flow are widely known and are used in a variety of applications. For example, valving systems are commonly used in the chemical and biochemical industries where different fluids are often mixed to obtain a desired end product. In such applications, the fluids are commonly delivered to a mixing chamber through a plurality of fluid lines. To control flow of the fluid through the lines, a variety of valves can be employed. The valves are opened and closed at appropriate times to deliver the fluids for mixing. After mixing, the valves can again be operated to distribute the mixed fluid for further processing, storage, delivery, or the like.

In one particular application, such a valving system is included in a chemical synthesizer which synthesizes diverse collections of molecules on a plurality of solid supports such as beads. An exemplary chemical synthesizer employing such a valving system is described in U.S. patent application Ser. No. 08/149,675, filed Nov. 2, 1993, the disclosure of which is herein incorporated by reference. Such a synthesizer employs a parent vessel to mix bead suspensions. The mixed beads are distributed through a common manifold to a plurality of reaction vessels. In the reaction vessels, the beads are exposed to different, selected monomers, which react on the beads to be coupled thereto. Examples of the use of beads with diverse molecular products synthesized thereon are disclosed in U.S. patent application Ser. No. 08/146,886, filed Nov. 2, 1993, the disclosure of which is herein incorporated by reference. The beads are then recombined through the manifold back to the parent vessel and mixed. The mixed bead suspension is then again divided among the plurality of reaction vessels, and the process of monomer addition, bead mixing, and redistribution continues. In such a process, a variety of valves are employed to distribute the fluids between the parent vessel and the reaction vessels and to introduce the reagents to the reaction vessels. Although the valves described in U.S. patent application Ser. No. 08/149,675 have proven to be effective, various improvements are desired.

For example, a common valve employed in such chemical synthesizers is a two-way plunger valve, commercially available from Applied Biosystems or General Valve Corp. The plunger valve has an input port and output port that are in communication with a central chamber. To close the valve, a plunger is pushed against a membrane which removes any fluid from the chamber and forms a seal between the input and output ports. In so doing, particulates, such as reagent beads or precipitation, which often collect in the membrane become smashed or trapped by the plunger. After continued use, the valve membrane becomes damaged by smashed particulate and fluid leaks even when the valve is closed.

One particular drawback of many valving systems, including the valving system of the above-referenced chemical synthesizer, is the limited number of input and output ports. Even three-way valves can sometimes be too limiting. Furthermore, as more ports are included, the size of the valves can become unduly large. For example, in some systems the three-way valves are connected in series to form a manifold. However, the combination of the three-way valves in this way can be problematic because of the size of the resulting manifold. This in turn unduly increases the overall size of the apparatus and requires more fluid.

Another drawback of many valving systems is that the valves are normally in an open state and require actuation by a power source to close the valves. Such a configuration can be undesirable if a power failure occurs while the valves are closed. In such a case, the valves return to their open state allowing reagents to drain from the fluid lines.

In yet another drawback to many valves, the cross-sectional area of the chamber connecting the input and output ports is often greater than that of the fluid paths. This can be problematic if mixing is desired to take place in the chamber. Because of the different sized cross-sections, complete mixing within the valve is difficult to obtain.

In still another drawback, many valving systems employ extensive tubing to connect the valves. Use of such tubing, however, requires more fluids to be introduced into the system to insure sufficient fluid is present for distribution through the system. This in turn can increase operation costs and reduce efficiency.

Another consideration in the design of valving systems in many chemical applications is the need for the valves to handle aggressive reagents or other fluid media. This can often limit the type of materials used to construct the valves.

For these and other reasons, it would be desirable to provide a valving system which could overcome or reduce such problems. Such a system should be tolerant to aggressive media and particles and should be self-cleaning. The system should also allow for multiple inputs and multiple outputs while maintaining a relatively small size and employing minimal tubing. Further, the valving system should provide for improved mixing within the valve chambers.

SUMMARY OF THE INVENTION

The invention, in a preferred embodiment, provides a fluid distribution system including both a first fluid path and a second fluid path that is laterally spaced-apart from the first fluid path. A third fluid path is provided which connects the first and the second fluid paths. A valve is axially translatable through the third fluid path between a first and a second position. In the first position, the valve is removed from the third fluid path. In the second position, the valve substantially fills the third fluid path. In this way, when the valve is in the first position fluid is free to flow between the first and second fluid paths through the third fluid path. When the valve is axially translated through the third fluid path to the second position, the third fluid path is substantially filled with the valve, thereby preventing fluid from traveling between the first and second fluid paths.

In an exemplary aspect, the valve includes an elongate shaft that is slidable within the third fluid path. Preferably, the third fluid path is cylindrical in geometry and the elongate shaft is also cylindrical in geometry and is sized to slide within the third fluid path so that fluid is prevented from passing between the first and second fluid paths as the shaft approaches the second position. An advantage in configuring the shaft in this manner is that the distal end of the shaft can be employed to push or scoop particulate from the third fluid path when the shaft is translated therethrough. In this way, the third fluid path is cleaned each time the valve is closed, thereby providing a self-cleaning valve system. In still another aspect, the first and the second fluid paths are also cylindrical in geometry, and the elongate shaft includes recessed portions at points of intersection with the first and the second fluid paths when in the second position. In this way, the valve when in the second position conforms to the geometry of both the first and the second fluid paths so that fluid can travel through these fluid paths substantially unhindered by the shaft when the valve is closed.

In one particular aspect of the invention, the first and the second fluid paths are arranged substantially orthogonal to each other. In another aspect, the third fluid path is positioned substantially orthogonal to both the first and the second fluid paths. By arranging the fluid paths in this manner, a network of fluid paths can be interconnected with the first and second fluid paths. For example, a fourth fluid path that is substantially parallel with and laterally spaced-apart from the first fluid path can be provided. A fifth fluid path can then be used to connect the second and the fourth fluid paths. A second valve is provided and is axially translatable between a first position and a second position through the fifth fluid path. In the first position, the valve is removed from the fifth fluid path, and in the second position the valve substantially fills the fifth fluid path.

In still another aspect, the shaft is constructed from polytetrafluoroethylene so that it is tolerant to aggressive media and other particulates. In a further aspect, the first, second, and third fluid paths are formed within a housing, and the housing is constructed from polytetrafluoroethylene.

To axially translate the valve between the first and second positions, an actuation means is provided. Preferably, the actuation means includes a solenoid.

In a further aspect, the first and the second fluid paths are spaced-apart by a distance that is about 1.3 times the diameter of the fluid path. In a preferable aspect, the first and the second fluid paths are spaced-apart by a center-to-center distance in the range from about 0.5 mm to 3 mm, and more preferably from about 0.9 mm to 1.1 mm. In still another aspect, the first and the second fluid paths are separated by a wall thickness in the range from about 0.1 mm to 0.2 mm.

In another embodiment of the invention, a fluid distribution system is provided. An important feature of this embodiment is that the fluid distribution system is configured as a building block that can be combined with similar fluid distribution systems to provide an increased number of input and output fluid lines. Such a fluid distribution system includes a housing defining at least a first pair of parallel fluid paths and at least a second pair of parallel fluid paths, with the second pair being orthogonal to and laterally spaced-apart from the first pair. The first pair of parallel fluid paths defines a first plane, and the second pair defines a second plane. The first pair of fluid paths is positioned relative to the second pair of fluid paths such that the first and the second planes are parallel. In such a manner, at least four fluid path crossing points are defined where the first pair of parallel fluid paths cross the second pair of parallel fluid paths. A connecting fluid path is provided at each of the crossing points so that each one of the first pair of parallel fluid paths and each one of the second pair of the parallel fluid paths are connected. A valve is provided at each of the crossing points, with each valve being axially translatable through the associated connecting fluid path between a first and a second position. In the first position, the valve is removed from the connecting fluid path, and in the second position, the valve substantially fills the connecting fluid path. By arranging the fluid paths in such a manner, a building block is formed that can be combined with similar building blocks to provide a desired number of input and output lines. The valves are then used to interconnect the fluid paths.

In a preferable aspect, each valve comprises an elongate shaft that is slidable within the associated connecting fluid path between the first and the second positions. In another aspect, each connecting fluid path is cylindrical in geometry, and the elongate shaft is also cylindrical in geometry and sized to slide within each connecting fluid path to prevent fluid from passing through each connecting fluid path when the shaft is in the second position. Preferably, both the shafts and the housing are constructed from polytetrafluoroethylene.

In another aspect, actuation means are provided for axially translating each valve between the first and second positions. In a further aspect, the first and the second planes are spaced-apart by a distance in the range from about 0.5 mm to 3 mm, and more preferably from about 0.9 mm to 1.1 mm.

In an alternative embodiment, a fluid distribution system is provided which includes a first fluid path and a second fluid path that is laterally spaced-apart from the first fluid path. A housing is provided for holding the first and the second fluid paths spaced-apart. The housing defines an aperture that is in communication with both the first and the second fluid paths. A valve is movably held within the aperture between a first and a second position. The valve includes an elongate groove that in combination with the housing defines a third fluid path connecting the first and the second fluid paths when the valve is in the first position. When the valve is rotated so that the groove is aligned with the first fluid path, the valve is in the second position. In this way, the valve no longer connects the first and the second fluid paths and fluid flow is prevented between the first and the second fluid paths.

In a preferable aspect, the aperture is spherical in geometry, and the valve includes a spherical member that is rotatably received in the aperture. The valve can be provided with a second elongate groove which is aligned with the second fluid path when the valve is in the second position. In this way, the first and the second elongate grooves are aligned with the fluid paths so that fluid is substantially unhindered by the valve when passing through the fluid paths.

In another aspect, rotation of the valve from the first position to the second position scoops particulate from the third fluid path and into the first fluid path. In this way, the valve is self-cleaned each time the valve is rotated.

The invention includes an exemplary method for placing two laterally spaced-apart fluid paths in communication. According to the method, a connecting fluid path is provided between the spaced-apart fluid paths. An elongate shaft is provided within the connecting fluid path to prevent fluid from flowing between the spaced-apart fluid paths. The elongate shaft is then axially translated to withdraw the shaft from the connecting fluid path and to allow fluid to travel between the spaced-apart fluid paths. In another aspect of the method, the shaft is axially translated back through the connecting fluid path to both prevent fluid from traveling therethrough and to push accumulated particulate from the connecting path. In another aspect, the pressure is varied in one of the spaced-apart fluid paths to enhance fluid flow through the connecting fluid path.

The invention further provides a method for preventing a valve in a valve system that connects two laterally spaced-apart fluid paths from clogging. The valve system includes an elongate shaft that is disposed within a connecting fluid path that connects the two laterally spaced-apart fluid paths. According to the method, the elongate shaft is axially translated through the connecting fluid path to push accumulated particulate from the connecting fluid path and into one of the spaced-apart fluid paths.

DETAILED DESCRIPTION OF THE SPECIFIC EMBODIMENTS

The invention provides a fluid distribution system, and in particular a multiple input, multiple output (MIMO™) clog-free valving system. By "multiple input, multiple output" it is intended to mean that the valving system includes multiple inputs and multiple outputs so that a variety of fluids can be distributed through the valving system concurrently. The valving system is configured so that the fluids can pass therethrough without cross contamination. The system's valves can selectively be operated to alter the path of the fluids within the system for rerouting to different output ports or to combine the fluids with other fluids in the system. What is meant by "clog-free" is that the valves are self-cleaning during operation, i.e., as the valves are actuated, they push, scrape, or sweep particulate away from the valve chamber to prevent particulate buildup or to prevent particulate from being smashed by operation of the valve.

Figure 1:
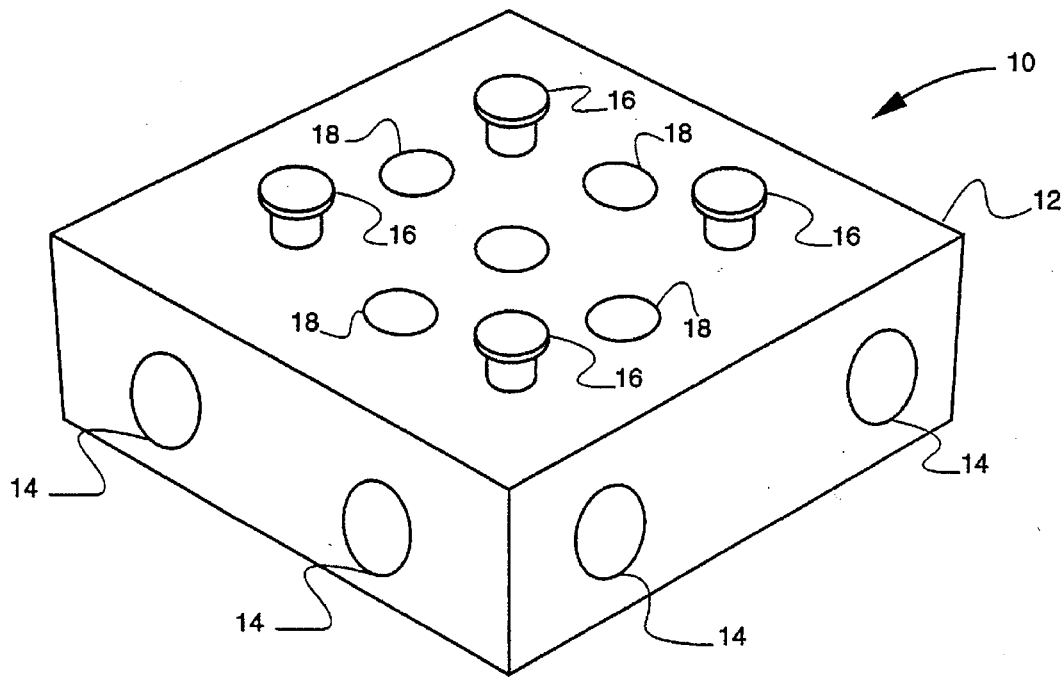
FIG. 1 is a perspective view of an exemplary embodiment of multiple input, multiple output (MIMO™) clog-free valving system according to the present invention.

To provide such features, the invention provides an exemplary embodiment of a fluid distribution or valving system 10 as shown in FIG. 1. The valving system 10 includes a housing 12 defining a plurality of input/output ports 14. In the embodiment of FIG. 1, two input/output ports 14 are provided on each side of the housing 12, making a total of eight. However, this number is shown only for convenience in discussion, and any number of input/output ports 14 can be provided. A plurality of valves 16 are slidably held within the housing 14. A plurality of sensors 18 are also provided for determining the volume and rate of fluid flow through the housing 12.

Figure 2:
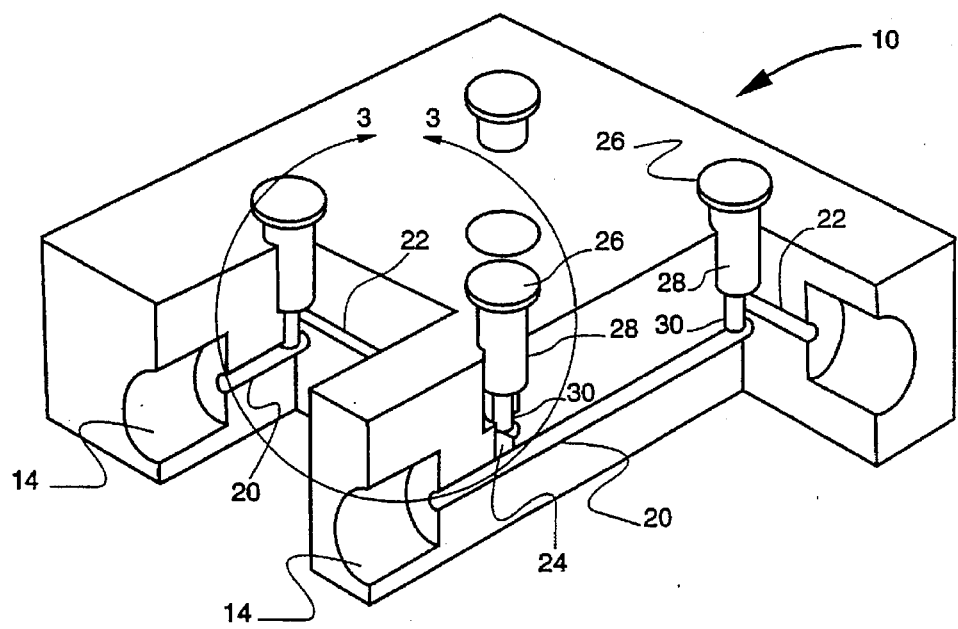
FIG. 2 is a cutaway view of the valving system of FIG. 1 showing operation of the valves.

Referring to FIG. 2, the valving system 10 will be described in greater detail. Formed in the housing 14 are a first pair of parallel fluid paths 20 and a second pair of parallel fluid paths 22 that are in communication with the input/output ports 14. Preferably, the first and second pairs 20, 22 are substantially orthogonal to each other. Connecting the first pair of parallel fluid paths 20 to the second pair of parallel fluid paths 22 are a plurality of connecting fluid paths 24 or valve chambers. The connecting fluid paths 24 are preferably orthogonal to both the first pair 20 and the second pair 22 of parallel fluid paths. The first pair of parallel fluid paths 20 are preferably aligned in a first plane, and the second pair of parallel fluid paths 22 are aligned in a second plane, with the first plane and the second plane being parallel to each other. Such a configuration provides for a systematic arrangement of the fluid paths 20, 22, the valves 16, and the input/output ports 14. Such an arrangement is preferable when using the valving system 10 in combination with similar or identical valving systems.

Each of the valves 16 includes a head 26, a body 28 and a distal portion 30. The body 28 and the distal portion 30 are slidably held within the housing 12 while the head remains outside the housing 12. A solenoid 80 (see FIGS. 4–5) is positioned over the head 26 to axially translate the valve 16 within the housing 12.

Figure 3:
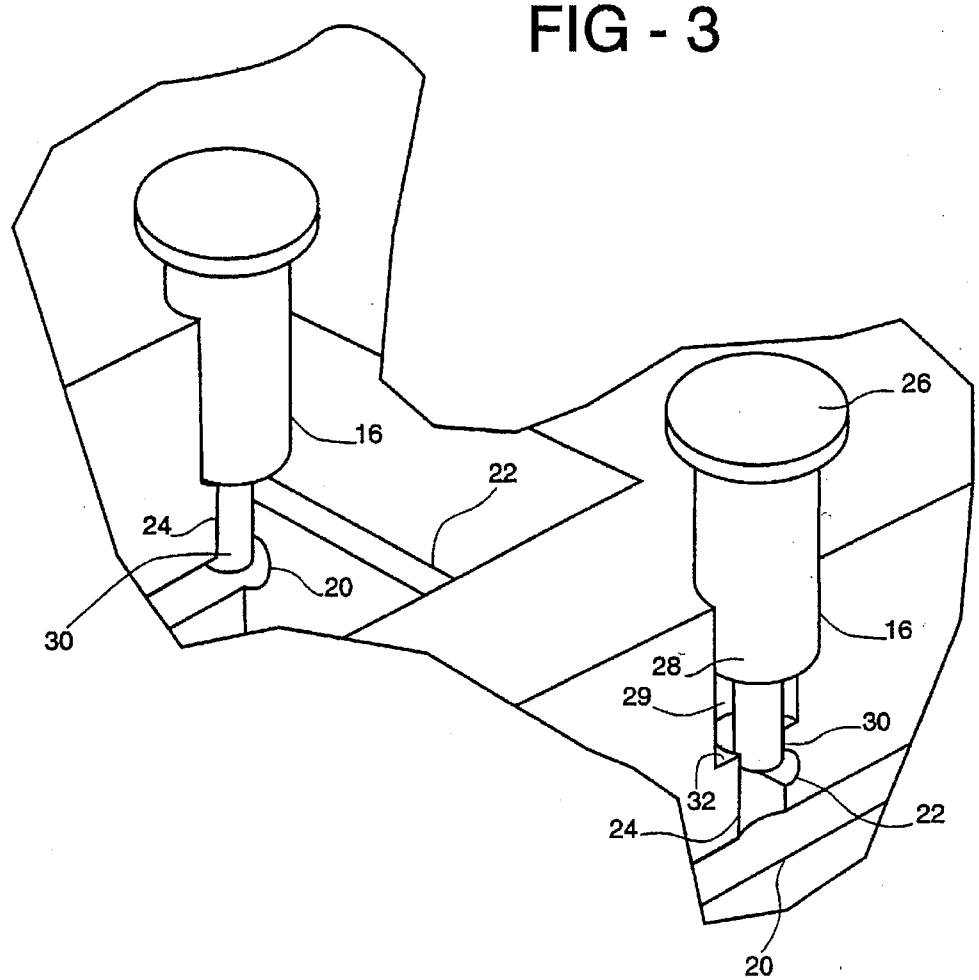
FIG. 3 is an enlarged view of an area included within line 3—3 of FIG. 2.

As best shown in FIG. 3, the distal portion 30 is axially translatable through the connecting fluid path 24. The connecting fluid path 24 is defined as the chamber which extends between the fluid path 20 and the fluid path 22, but not beyond the fluid path 22. In this way, when the distal portion 30 of the valve 16 is axially translated just beyond the connecting fluid path 24, the valve 16 is in a first or an open position (as shown by valve 16 on the right side of FIG. 3). In such a position, the distal portion 30 is removed from the fluid path 22 and serves to channel or direct the flow of fluid between the connecting fluid path 24 and the fluid path 22.

As the distal portion 30 is translated through the connecting fluid path 24, it initially passes partially through the fluid path 22. Depending on the amount of the distal portion 30 that is partially within the fluid path 22, the valve 16 can be used to proportionally control the rate of flow through the connecting fluid path 24. After the distal portion 30 is translated beyond the fluid path 22, fluid is prevented from passing through the connecting fluid path 24. Upon further axial translation, the distal portion 30 continues to fill the connecting fluid path 24. As the distal portion 30 reaches the fluid path 20, the entire connecting fluid path 24 is substantially filled with the distal portion 30, and the distal portion 30 is generally flush with the fluid path 20. At this point, the valve 16 is in a second or closed position (see valve 16 on the left hand side of FIG. 3). Although such a position is defined as the "closed" position, prevention of fluid flow between the fluid paths 20, 22 begins as the distal portion passes just beyond the fluid path 22. Further travel of the distal portion 30 serves to fill the connecting fluid path 26 and to remove particulate from the chamber.

To prevent the distal portion 30 from traveling into the fluid path 20, a stop 32 is formed in the housing 12 and engages with the body 28 of the valve 16 when the valve 16 reaches the closed position. When the distal portion 30 is withdrawn from the connecting fluid path 24 to the open position, the head 26 engages the solenoid 80 (see FIG. 5) and prevents further travel of the distal portion 30.

The fluid paths 20, 22, and 24, along with the distal portion 30 of valve 16 are preferably cylindrical in geometry, but can be formed with other suitable geometries as well. The distal portion 30 is sized sufficient so that it can slide within the connecting fluid path 24 while still forming a seal between the distal portion 30 and the connecting fluid path 24 to prevent fluid flow between the fluid paths 20 and 22. The body 28 of valve 16 is held within an aperture 29. Both the body 28 and aperture 29 are preferably cylindrical in geometry, but can also be formed with other geometries as well.

Both the housing 12 and the valves 16, particularly the distal portion 30 will preferably be constructed of polytetrafluoroethylene (commonly referred to by the trade name Teflon). Use of polytetrafluoroethylene is advantageous in that it is highly tolerant to aggressive media and other particulates, such as those described in U.S. patent application Ser. No. 08/149,675. Another particular advantage in using Teflon is that the coefficient of friction between two Teflon surfaces is relatively small upon application of a shear force. Thus, when the valve 16 is translated, the Teflon-on-Teflon arrangement allows for easy translation of the valve 16. The head 26 will preferably be constructed of metal to allow the head 26 to interact with the solenoid. Alternative materials for constructing the valves 16 and housing 12 include plastics, such as polypropylene, polyethylene, ceramics, metals and the like.

Figure 3A:
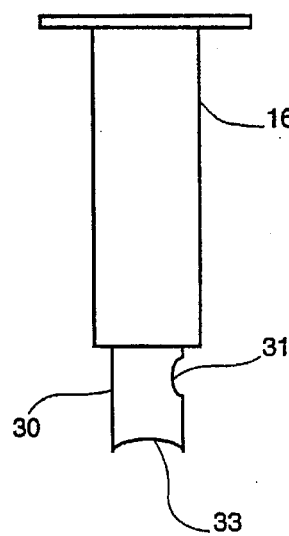
FIG. 3A is a side view of an exemplary valve according to the present invention.

In a preferable aspect, the distal portion 30 of each valve 16 includes a groove 31 crosswise along its length as shown in FIG. 3A. The groove 31 is aligned with the fluid path 22 when the valve 16 is in the closed position. The groove 31 has a radius conforming to the radius of the fluid path 22 so that the fluid path 22 has a constant cross sectional area when the valve 16 is in the closed position. Similarly, at a distal end of the distal portion 30, a second groove 33 can optionally be formed having the same radius as the fluid path 20. In this way, the cross-sectional area of the fluid path 20 is constant when the valve 16 is in the closed position. Providing the grooves in the valve 16 is advantageous in that fluid can flow through the paths 20 and 22 substantially unhindered by the valve 16. A constant cross-sectional area also provides for easier flushing of fluid from the fluid paths 20 or 22.

Although the valving system 10 can be operated over a large range of pressure differences, an exemplary feature of the valving system 10 is that relatively low pressures can be employed to draw fluid through the connecting fluid paths 24. As one example, a pressure difference of 6 psi (10 psi to 4 psi) has been found sufficient to draw fluid flowing from the fluid path 20, through the connecting fluid path 24, and into the fluid path 22. Pressure differences used to enhance fluid flow can be accomplished by either applying a pressure source or a vacuum to the appropriate input/output ports 14.

The valving system 10 can be configured to be any size, ranging from large-scale commercial applications, including chemical plants employing large diameter pipes, i.e. greater than several centimeters, to small-scale applications, including laboratory equipment. For convenience of discussion, this description will focus primarily on small-scale applications, particularly with laboratory equipment. However, the valving system can be increased in scale for use in large-scale applications. The fluid paths 20 and 22 can be spaced-apart by any distance, but will preferably be positioned relatively close together to both reduce the length of the valve stroke and to reduce the overall size of the valving system 10. In a particularly preferable aspect, the fluid paths 20 and 22 are spaced-apart by a distance that is about 1.3 times the diameter of the fluid path. In another preferable aspect, the fluid paths 20 and 22 are spaced-apart by a center-to-center distance in the range from about 0.1 mm to 5 cm, more preferably at about 0.5 mm to 3 mm, and still more preferably from about 0.9 mm to 1.1 mm. In still another aspect, the fluid paths 20 and 22 are separated by a wall thickness in the range from about 0.05 mm to 3 cm, and more preferably at about 0.1 mm to 0.2 mm. The particular diameter of the fluid paths 20, 22, and 24 can be varied depending on the particular application, and will preferably be in the range from about 0.5 mm to 1.6 mm for most laboratory applications, but can be much larger for other applications. For use in a chemical synthesizer, the diameters will preferably be in the range from about 0.8 mm to 1.6 mm.

Figure 4:
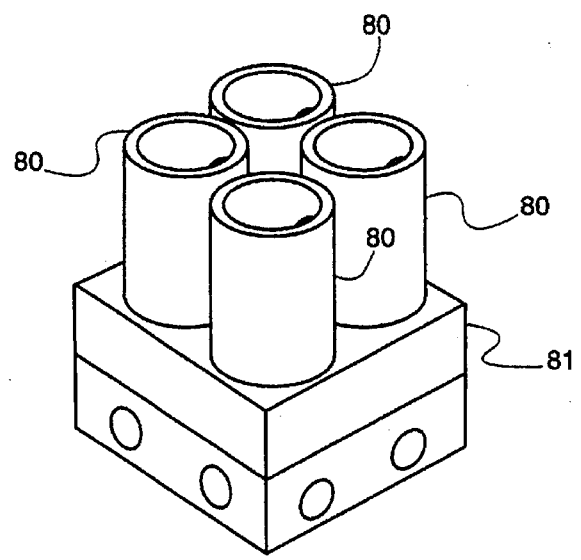
FIG. 4 is a perspective view of the valving system of FIG. 1 having a plurality of solenoids to actuate the valves.
Figure 5:
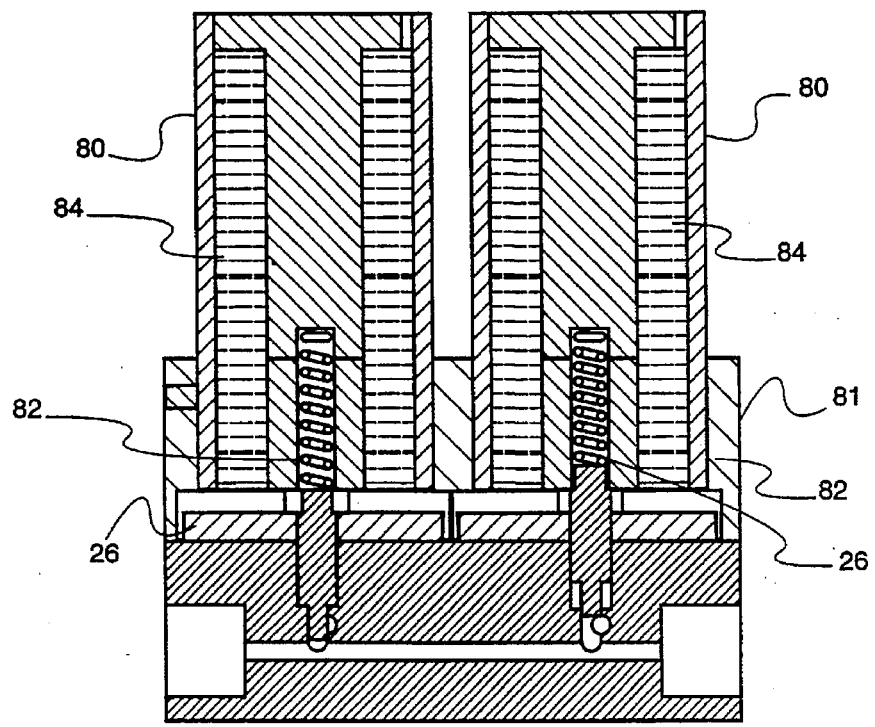
FIG. 5 is a cutaway side view of the valving system of FIG. 4.
Figure 6:
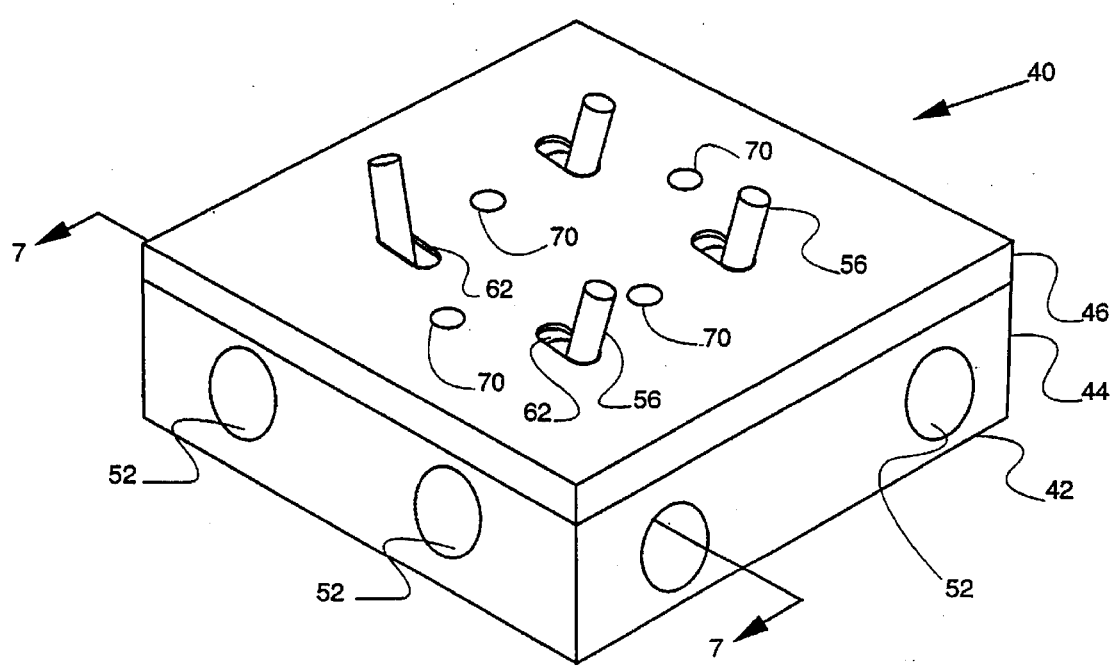
FIG. 6 is an alternative embodiment of a MIMO clog-free valving system according to the present invention.
Figure 7:
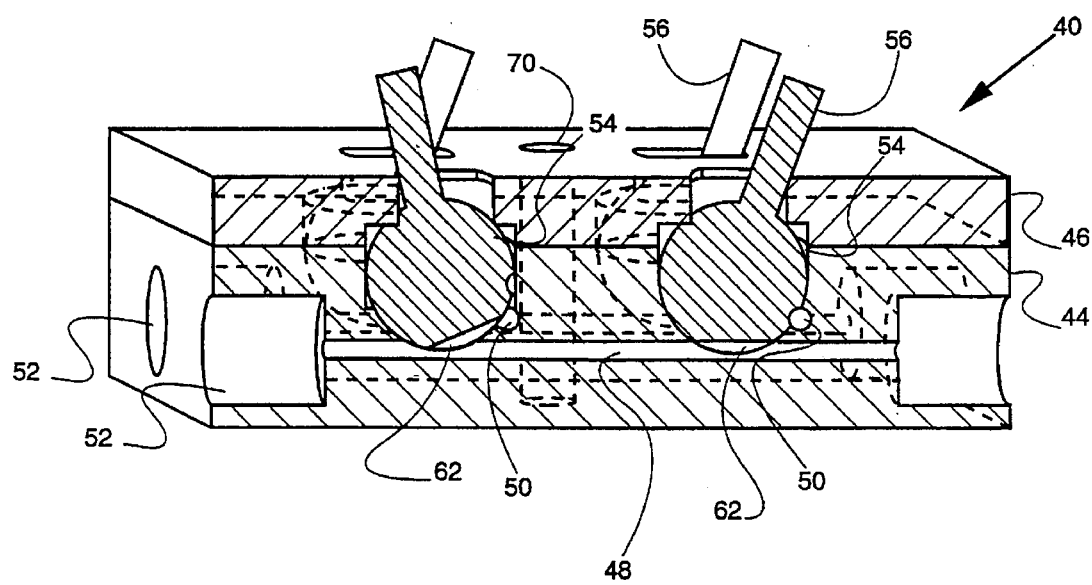
FIG. 7 is a cross-sectional view of the valving system of FIG. 6 taken along lines 7—7.

As shown in FIGS. 4 and 5, the valves 16 are preferably translated by actuation of a solenoid 80. Other mechanisms of actuation can also be employed such as nickel-titanium (muscle) wire, bimetals, air or vacuum cylinders, and the like, and the invention is not limited solely to the use of a solenoid. Use of a solenoid is desirable because the valves can be remotely controlled with a separate controller, such as a personal computer. The controller can be programmed to send an electronic signal to the solenoid 80 to move the valves as desired. The solenoid 80 is positioned over the head 26 of the valve 16 by a top plate 81. The solenoid 80 includes a biasing mechanism 82, conveniently formed as a spring, for biasing the valve 16 in the closed position. To translate the valve 16 into the open position, current is supplied to windings 84 in the solenoid 80 which produces a magnetic field to lift the head 26. To close the valve, the supply of current is stopped thereby allowing the biasing mechanism 82 force the valve 16 into the closed position. An advantage of biasing the valve 16 in a normally closed position is that fluid is prevented from flowing between the fluid paths 20 and 22 in the event of a power loss thereby preventing reagents from draining from the lines.

Referring back to FIG. 1, the sensor 18 is embedded into the housing 12 and is used to sense the real time rate of fluid flow through the fluid paths 20 and 22. The sensor 18 can also be used to detect the presence of fluid within the fluid paths of housing 12. The volume of fluid can then be calculated. In this manner, an amount of solvent, such as DMF, needed to flush the fluid paths can be estimated. Suitable sensors are described in U.S. patent application Ser. No. 08/149,675, previously incorporated by reference. As described therein, such sensors can also be used to aid in delivery of measured quantities or ratios of reagents in a chemical synthesizer. In this manner, a specific volume can be delivered or two or more fluids can be mixed at specific ratios into a common fluid path.

A particular advantage of the valving system of the invention is that the number of valves can be varied according to the particular application. The valving system can be configured to contain only a single valve with a single input and a single output port. Alternatively, the valving system 10 of FIG. 1 can be configured as a linear manifold by opening only the valves 16 along one side of the housing 12, e.g., along the side adjacent to the cutaway fluid path 20. Fluid can then be directed through the fluid path 20 where it will be distributed among the orthogonal fluid lines 22 and will exit through the associated input/output ports 14.

The valving system 10 is shown in FIG. 1 as a 2×2 valve array, i.e. having two intersecting pairs of parallel fluid paths with a valve at each point of intersection. Alternatively, the size of the valve array can be varied by increasing the size of the housing 12, and by providing additional fluid paths, corresponding input/output ports, and associated valves. As one example, a 3×2 array (having six valves) could be formed by providing a housing including three parallel fluid paths 20 that cross two parallel fluid paths 20.

Instead of changing the size of the housing to vary the size of the array, the 2×2 array shown in FIGS. 1–3 (or any other sized array) can be used in combination with another valving system to form a larger array. For example, the valving system 10 can be combined with another 2×2 array to form a 2×4 array having eight valves and twelve input/output ports. Other valving systems 10 can be added or subtracted to vary the overall configuration as desired. Arrangement of the fluid paths 20 in a plane that is parallel to the plane having the fluid paths 22 provides a convenient and systematic valving arrangement suitable for combination with another similar valving system.

Constructing the valving system 10 as described herein allows for a reduction in size as compared to prior art valving systems. For example, the valving system 10 can be used to replace the ESL machine manifold employing three-way valves that are connected in series as described in U.S. patent application Ser. No. 08/149,675, previously incorporated herein by reference. The valving system 10 can also be employed in the VLSIPS™ synthesizer, used for research at Affymax Research Institute, Palo Alto, Calif. Reduction in valving size is preferable in that the overall size of the synthesizer or other apparatus can be greatly reduced. Reduction in the size of the valving system 10 is further advantageous in that less chemicals or reagents are needed in the connecting fluid lines, thereby reducing the costs of operation.

Another advantage of the valving system 10 is that different fluids can be delivered through the housing 12 in parallel without cross-contamination. If rerouting or mixing is desired, the applicable valves 16 can be selectively opened. For instance, fluid in one of the paths 22 can be rerouted to the adjacent parallel fluid path 22 by opening two of the valves 16 along the orthogonal fluid path 20 to allow the parallel lines to communicate through the fluid path 20. Alternatively, the fluid in the path 22 could be rerouted to the orthogonal fluid path 20 by opening the valve 16 where the fluid paths 20 and 22 cross. Mixing can occur at any time by simply opening one of the valves 16 that separates two crossing fluid paths having the fluids to be mixed. As previously described, pressure gradients can be used to assist in the routing of fluid through the fluid paths when the valves 16 are opened.

Other advantages of the valving system 10 are that the component parts can be manufactured by conventional machining or molding, thereby reducing the cost of construction. Construction is simplified because only one moving part, the valve 16, is employed to connect to flow lines. Another feature is that the valves 16 can be translated partially into the fluid paths 22 to provide for proportional fluid flow. In still another advantage, the fluid lines are arranged in straight paths, thereby reducing the amount of pressure loss normally incurred in conventional valves having winding fluid paths. Another advantage is the constant cross-section of the valves which aids in complete flushing of the fluids.

Figure 8:
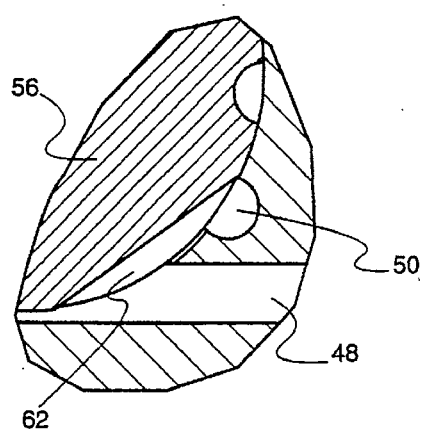
FIG. 8 is an enlarged view of one of the valves of FIG. 7 shown in an open position.
Figure 9:
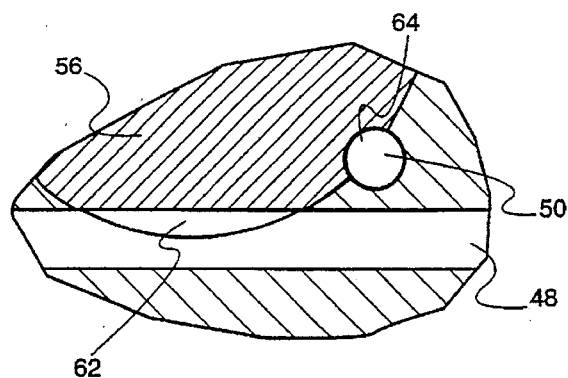
FIG. 9 is an enlarged view of one of the valves of FIG. 7 shown in a closed position.
Figure 10:
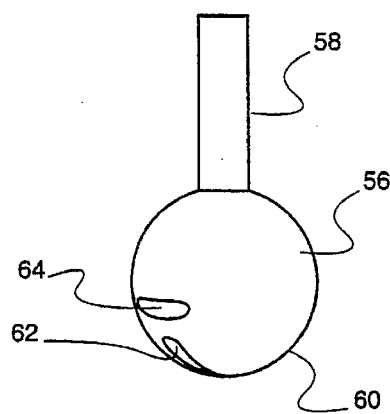
FIG. 10 is a perspective view of one of the valves of the valving system of FIG. 7.

Referring to FIGS. 6–10, an alternative embodiment of a valving system 40 will be described. The valving system 40 includes a housing 42 that is conveniently formed of a top plate 44 and a bottom plate 46. Formed within the bottom plate 46 are a first pair of parallel fluid paths 48 and a second pair of parallel fluid paths 50 that are orthogonal to the first pair 48. The fluid paths 48, 50 are essentially identical to the fluid paths 20 and 22 of the valving system 10. A plurality of input/output ports 52 are included for providing access to the fluid paths 48 and 50, and are essentially identical to the input/output ports 14 of the valving system 10. Also formed within the housing 42 are a plurality of apertures 54 that are generally spherical in geometry. Disposed in the apertures 54 are a set of valves 56. As best shown in FIG. 10, the valves 56 include a handle 58 and a spherical bottom portion 60. Formed within the bottom portion 60 are two elongate grooves 62 and 64. The valves 56 are held within the apertures 54 and are free to rotate. A guide 62 in the top plate 44 positions the valves 56 in the apertures 54 so that translation of the handle 58 within the guide 62 moves the valves 56 between an open position (see the cutaway valve 56 on the left side of FIG. 7) and an open position (see the cutaway valve 56 on the right side of FIG. 7).

As more clearly shown in FIG. 8, when the valve is in the open position, the elongate groove 62 is placed in communication with both the fluid path 48 and the fluid path 50. In this way, when the valve 56 is in the open position, a third or connecting fluid path is formed between the fluid paths 48 and 50. As best shown in FIG. 9, when the valve 56 is translated to the closed position, the elongate groove 62 becomes aligned with the fluid path 48, and the elongate groove 64 becomes aligned with the fluid path 50. By aligning the elongate groove 62 with the fluid path 48, the bottom portion 60 of the valve 56 closes off the connecting fluid path and prevents fluid from traveling between the fluid paths 48 and 50. The elongate grooves 62 and 64 are preferably provided with a radius that conforms substantially to the radius of the fluid paths 48 and 50 so that fluid can travel substantially unhindered past the valve 56 when fluid is traveling through the fluid paths 48 and 50. As with the valves 16 of the valving system 10, the valves 56 are self-cleaning. As the valves 56 are translated from the open position to the closed position, the elongate groove 62 becomes flush with the fluid path 48. Any particulate within the connecting fluid path is scooped or scraped into the fluid path 48 and from the aperture 54.

A plurality of sensors 70 are provided for sensing the presence of fluid in the paths 48, 50. Sensors 70 can be essentially identical to sensor 18 of FIG. 1.

Referring back to FIGS. 1–5, an exemplary method for operating the valving system 10 will be described. Fluid is introduced into the system 10 through selected ones of the input/output ports 14. Once the fluid is introduced, the path of the fluids can be altered at any one of the crossing points having the valves 16. To open a valve, a solenoid is actuated to produce a magnetic field and lift the metal head 26 and translate the valve 16 to the open position. At this point, fluid is free to flow through the opened connecting fluid path 24 and into the associated orthogonal fluid path. To close the open valve 16, the solenoid is deactuated allowing the spring in the solenoid to depress the valve 16 into the closed position. During closing of the valve, any particulate remaining in the connecting fluid path is forced out of the connecting fluid path by the distal portion 30. In this way, each time a valve 16 is closed, the valve is cleaned of any remaining particulate.

Although the foregoing invention has been described in detail by way of illustration and example, for purposes of clarity of understanding, it will be obvious that certain changes and modifications may be practiced within the scope of the appended claims.

What is claimed is:

1. A fluid distribution system, comprising:

a first fluid path;

a second fluid path laterally spaced-apart from the first fluid path;

a third fluid path connecting the first and the second fluid paths, wherein the third fluid path has a length and a width, and wherein an axis extends the length of the third fluid path; and a valve axially translatable through the length of the third fluid path between a first position and a second position, wherein the valve is removed from the third fluid path when in the first position so that fluids may flow substantially unobstructed through the first fluid path, then through the third fluid path, and into the second fluid path, wherein the valve substantially fills the third fluid path and is absent from the first fluid path when in the second position, with the valve pushing substantially all particulate from the third fluid path and into the first fluid path when translated from the first to the second position, and wherein the first fluid path remains unobstructed to allow fluid to flow through the first fluid path when the valve is in the second position to flush the pushed out particulate to a location along the first fluid path away from the third fluid path.

2. The system of claim 1, wherein the first and the second fluid paths are substantially orthogonal to each other.

3. The system of claim 2, wherein the third fluid path is substantially orthogonal to both the first and the second fluid paths.

4. The system of claim 3, further comprising a fourth fluid path substantially parallel with and laterally spaced-apart from the first fluid path, a fifth fluid path connecting the second and the fourth fluid paths, and a second valve axially translatable between a first position and a second position through the fifth fluid path, wherein the valve is removed from the fifth fluid path when in the first position and substantially fills the fifth fluid path when in the second position.

5. The system of claim 1, wherein the valve comprises an elongate shaft slidable within the third fluid path.

6. The system of claim 5, wherein third fluid path is cylindrical in geometry, and wherein the elongate shaft is cylindrical in geometry and sized to slide within the third fluid path and to prevent fluid from passing between the first and the second fluid paths when the shaft approaches the second position.

7. The system of claim 5, wherein the shaft includes a distal end for pushing particulate from the third fluid path when the shaft is translated through the third fluid path.

8. The system of claim 6, wherein the first and the second fluid paths are cylindrical in geometry, and herein the elongate shaft includes recessed portions at points of intersection with the first and the second fluid paths when in the second position, whereby fluid can travel through the first and second fluid paths substantially unhindered by .the shaft when in the second position.

9. The system of claim 4, wherein the shaft is constructed from polytetrafluoroethylene.

10. The system of claim 9, wherein the first, second, and third fluid paths are formed within a housing, and wherein the housing is constructed from polytetrafluoroethylene.

11. The system of claim 4, further comprising actuation means for axially translating the valve between the first and the second positions.

12. The system of claim 11, wherein the actuation means comprises a solenoid.

13. The system of claim 1, wherein the first and the second fluid paths are spaced-apart by a distance in the range from 0.5 mm to 3 mm.

14. A fluid distribution system, comprising:
a first fluid path;
a second fluid path laterally spaced-apart from the first fluid path;
a housing for holding the first and the second fluid paths spaced-apart, the housing having an aperture in communication with both the first and the second fluid paths; and
a valve movable within the aperture between a first and a second position, the valve having an elongate groove along a surface thereof, wherein the groove in combination with the housing define a third fluid path connecting the first and the second fluid paths when the valve is moved to the first position, wherein the groove is aligned with the first fluid path when the valve is moved to the second position, thereby preventing fluid flow between the first and the second fluid paths, wherein the valve pushes particulate from the third fluid path when moved from the first position to the second position, and wherein the first fluid path remains unobstructed by the groove when aligned with the first fluid path to allow fluids to flow through the first fluid path and the groove when the valve is in the second position to flush the pushed out particulate to a location along the first fluid path away from the third fluid path.

15. The system of claim 14, wherein the aperture is spherical in geometry, wherein the valve comprises a spherical member rotatably received in the aperture.

16. The system of claim 15, wherein the valve includes a second elongate groove, wherein the second is aligned with the second fluid path when the valve is in the second position.

17. The system of claim 16, wherein rotation of the valve from the first position to the second position scoops particulate from the third fluid path and into the first fluid path.

18. The system of claim 16, wherein the first and the second fluid paths are cylindrical in geometry, and wherein the grooves have a radius substantially conforming to the radius of the first and the second fluid paths.

19. The system of claim 14, wherein the first and the second fluid paths are orthogonal to each other.

20. A fluid distribution system, comprising:
a housing defining at least a first pair of parallel fluid paths and at least a second pair of parallel fluid paths, the second pair being orthogonal to and laterally spaced apart from the first pair, wherein the first pair defines a first plane and the second pair defines a second plane, and wherein the first and the second planes are parallel to define at least four fluid path crossing points;
a connecting fluid path at each of the crossing points, each connecting fluid path connecting one of the first pair of parallel fluid paths with one of the second pair of parallel fluid paths, wherein each connecting fluid path has a length and a width, and wherein an axis extends the length of each connecting fluid path; and
a valve at each of the crossing points, each valve being axially translatable through the length of the associated connecting fluid path between a first position and a second position, wherein at least one of the valves is removed from the associated connecting fluid path when in the first position and substantially fills the associated connecting fluid path and is absent from the associated fluid path of the first pair of parallels fluid paths when in the second position, with the valve pushing substantially all particulate from the associated connecting fluid path and into the associated fluid path of the first pair of fluid paths when translated from the first to the second position, and wherein the associated fluid path of the first pair of parallel fluid paths remains unobstructed by the valve to flow a fluid to flow through the associated fluid path of the first pair of parallel fluid paths when the valve is in the second position to flush the pushed out particulate to a location along the associated fluid path of the fist pair of parallel fluid paths away from the associated connecting fluid path.

21. The system of claim 20, wherein each valve comprises an elongate shaft that is slidable within the associated connecting fluid path between the first and the second positions.

22. The system of claim 21, wherein each connecting fluid path is cylindrical in geometry, and wherein the elongate shaft is cylindrical in geometry and sized to slide within each connecting fluid path to prevent fluid from passing through each connecting fluid path when the shaft is in the second position.

23. The system of claim 21, wherein each shaft and the housing are constructed from polytetrafluoroethylene.

24. The system of claim 20, further comprising actuation means for axially translating each valve between the first and the second positions.

25. The system of claim 24, wherein the actuation means comprises a solenoid.

26. The system of claim 20, wherein the first and the second planes are spaced apart by a distance in the range from 0.5 mm to 3 mm.

27. The system of claim 20, further comprising means for connecting the housing to a second housing.

28. A method for placing two laterally spaced-apart fluid paths in fluid communication, the method comprising:

providing a connecting fluid path between spaced-apart first and second fluid paths, the connecting fluid path having an axial length;

providing an elongate shaft to move within the connecting fluid path;

axially translating the elongate shaft to a closed position within the connecting fluid path to prevent fluid from flowing between the spaced-apart fluid paths and to push substantially all particulate from the connecting fluid path and into the first fluid path, wherein the shaft is absent from the first fluid path when in the closed position;

passing a fluid through the first fluid path to move the particulate away from the connecting fluid path, wherein the fluid passes through the first fluid path unobstructed by the elongate shaft while in the closed position; and axially translating the elongate shaft the length of the connecting fluid path to withdraw the shaft from the connecting fluid path so that fluids may flow substantially unobstructed through one of the spaced-apart fluid paths, through the connecting fluid path, and into the other spaced-apart fluid path.

29. The method of claim 28, further comprising axially translating the elongate shaft back through the connecting fluid path to prevent fluid from travelling therethrough and to push accumulated particulate from the connecting fluid path.

30. The method of claim 28, further comprising varying the pressure in one of the spaced-apart fluid paths relative to the other spaced-apart fluid path to enhance fluid flow through the connecting fluid path.

31. A method for preventing a valve in a valve system connecting laterally spaced-apart first and second fluid paths which are out of axial alignment with each other from clogging, the valve system comprising an elongate shaft disposed within a connecting fluid path connecting the laterally spaced-apart fluid paths, and wherein the connecting fluid path has an axial length, the method comprising:

axially translating the elongate shaft through the length of the connecting fluid path to a closed position, wherein the shaft substantially fills the connecting fluid path and is absent from the first fluid path when in the closed position to push substantially all accumulated particulate from the connecting fluid path and into the first fluid path; and passing a fluid through the first fluid path to move the particulate away from the connecting fluid path, wherein the fluid passes through the first fluid path unobstructed by the shaft.

* * * * *